No. 727,296. PATENTED MAY 5, 1903.
R. M. CONNABLE.
VEHICLE TIRE AND FASTENING THEREFOR.
APPLICATION FILED FEB. 18, 1903.
NO MODEL.
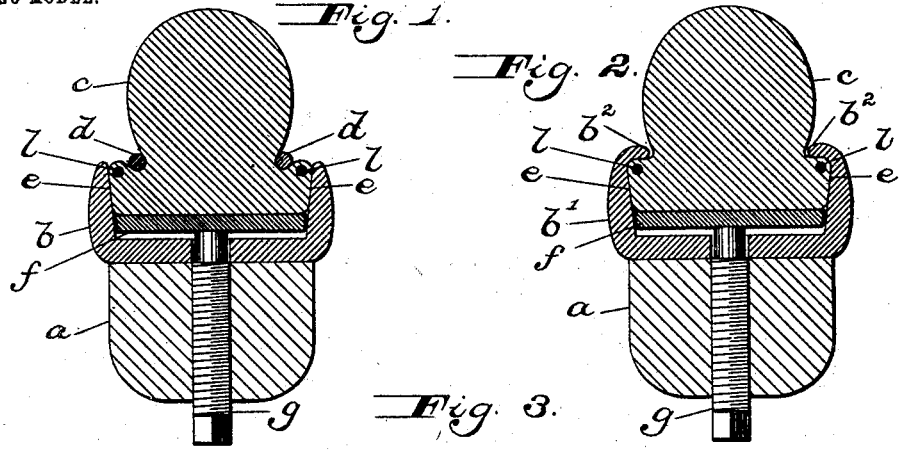
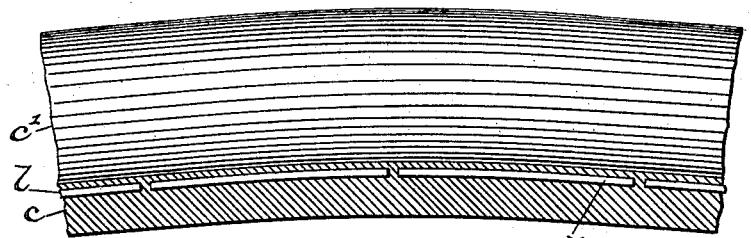
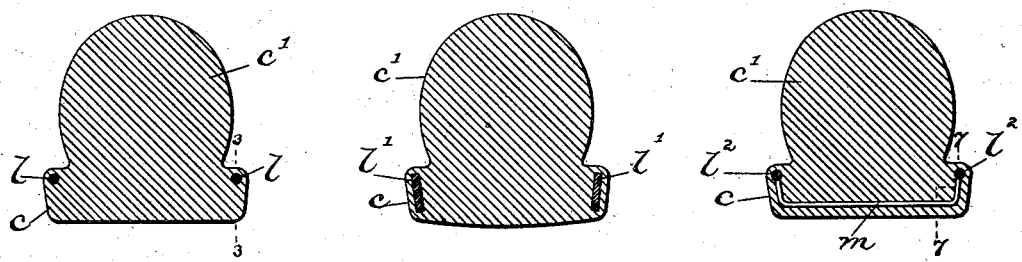
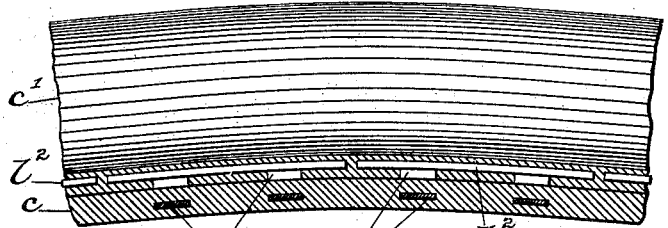
Witnesses
H. F. Meyer Jr.
G. F. Vogt.
Inventor
Ralph M. Connable
By Mann & Co.
Attorneys.

No. 727,296. Patented May 5, 1903.

UNITED STATES PATENT OFFICE.

RALPH M. CONNABLE, OF BALTIMORE, MARYLAND.

VEHICLE-TIRE AND FASTENING THEREFOR.

SPECIFICATION forming part of Letters Patent No. 727,296, dated May 5, 1903.

Application filed February 18, 1903. Serial No. 143,890. (No model.)

*To all whom it may concern:*

Be it known that I, RALPH M. CONNABLE, a citizen of the United States, residing at Baltimore, State of Maryland, have invented certain new and useful Improvements in Vehicle-Tires and Fastenings Therefor, of which the following is a specification.

This invention relates to improvements in elastic vehicle-tires and fastenings therefor; and its object is to provide an improved construction of tire and tire-fastening which will produce a secure fastening of the tire on the vehicle-wheel and prevent the tire from becoming disengaged in use, especially guarding against any sidewise or torsional strain to which the tire may be subjected.

The invention consists of certain constructions and arrangements of parts hereinafter fully described and claimed, reference being had to the accompanying drawings, in which—

Figure 1 is a transverse sectional view taken through the felly of a vehicle-wheel and showing my improved tire secured thereon by means of retaining wires or ties. Fig. 2 is a similar view showing a different form of retaining means. Fig. 3 is a longitudinal view of a portion of the tire, partly in section, on the line 3 3 of Fig. 4. Fig. 4 is a transverse sectional view of the same. Figs. 5 and 6 are transverse sectional views of slightly-modified forms of the tire. Fig. 7 is a longitudinal view, partly in section, on the line 7 7 of Fig. 6.

Referring to the drawings, the letter $a$ designates the felly of a vehicle-wheel, to which is secured a channeled rim $b$, Fig. 1, for the reception of the elastic tire $c$. The said tire is seated in said rim and is retained thereon against outward displacement, in this instance by bands or tie-wires $d$, engaging the upper side of outwardly-extending side flanges $e$ at the base of the tire, and the tire is compressed outwardly against said retaining means by pressing devices comprising in this instance a band $f$, interposed between the base of the tire and the bottom of the channeled rim, said band being pressed outwardly against the base of the tire by a plurality of threaded bolts $g$, working through the felly $a$ and the channeled rim, as illustrated in the drawings.

Fig. 2 illustrates the retaining means as produced by the inwardly-extending edges $b^2$ of the channeled rim $b'$ instead of the tie-wires $d$.

Prior patents, Nos. 712,179 and 715,987, granted to me October 28, 1902, and December 16, 1902, respectively, and my pending application, Serial No. 141,837, filed February 4, 1903, all describe and claim various embodiments of the inventive idea thus far set forth in the detail description of this specification—that is, a tire-fastening comprising tire-retaining means, such as the wires $d$ or rim edges $b^2$, in combination with means for compressing the tire outwardly against said retaining means; but the present invention comprehends in addition or as an addition to the said retaining means and outwardly-compressing means and also as novel and complete *per se* a tire provided with certain features which insure that the tire will be very firmly secured to the vehicle-wheel, and especially insuring against displacement by any sidewise or torsional strain to which the tire may be subjected. To this end, therefore, I have provided, as illustrated in Figs. 1, 2, 3, and 4, a tire with side flanges $e$, in which are molded or otherwise embedded near the upper corners or edges stiffening or resistance devices in the form of circumferentially or longitudinally extending lengths of wire with their ends close together, as shown in Fig. 3. When such a tire is applied to the channeled rim of the vehicle-wheel, said resistance-wires $l$ have such position that the retaining means, such as the wires $d$ or rim edges $b^2$, lie between said resistance-wires and the body or tread $c'$ of the tire, and hence any sidewise or torsional strain on the latter at any point is met and resisted by said wires $l$, and their comparatively long and stiff bearing-surface prevents the tire from being pulled out from under the retaining means. It is obvious that the resistance-wires $l$ may be made continuous or in one piece instead of a plurality of lengths.

As shown in Fig. 5, the resistance devices may be strips of sheet metal $l'$, vertically elongated or of rectangular or other cross-sectional shape, and, if desired, one resistance-wire $l^2$ may be joined to the opposite wire by any desired number of transverse bars $m$, as illustrated in Figs. 6 and 7.

It is to be understood that my invention is not limited to any particular shape of tire, and it is also to be understood that changes may be made in the details of construction and arrangement of parts herein shown and described without departing from the scope of the invention as defined in the appended claims.

Having thus fully described my invention, what I claim as new, and desire to secure by Letters Patent, is—

1. The combination of a vehicle-wheel rim; an elastic tire in said rim; retaining means holding said tire in the rim against outward displacement; and circumferentially-extending stiffening or resistance devices embedded in the tire between the retaining means and the side of the rim, as and for the purpose set forth.

2. The combination with a vehicle-wheel having a channeled rim, of a tire seated in said rim and provided with side flanges having resistance-wires embedded therein at the upper outer corners thereof; and retaining means holding the tire against outward displacement and located between said resistance-wires and the tread of the tire, as and for the purpose set forth.

3. The combination with a vehicle-wheel having a channeled rim, of a tire seated in said rim and provided with side flanges having resistance-wires embedded therein at the upper outer corners thereof; retaining means holding the tire against outward displacement and located between said resistance-wires and the tread of the tire; and means for compressing the tire outwardly against said retaining means, as set forth.

In testimony whereof I affix my signature in the presence of two witnesses.

RALPH M. CONNABLE.

Witnesses:
   H. F. MEYER, Jr.,
   FREDERICK S. STITT.